United States Patent [19]
Kress et al.

[11] Patent Number: 5,786,674
[45] Date of Patent: Jul. 28, 1998

[54] HYDRAULIC SERVO CONTROL PARTICULARLY HYDRAULIC POWER STEERING SYSTEM FOR MOTOR VEHICLES

[75] Inventors: Wolfgang Kress, Stuttgart; Uwe Kooths, Sindelfingen, both of Germany

[73] Assignee: Mercedes-Benz AG, Germany

[21] Appl. No.: 876,024

[22] Filed: Jun. 13, 1997

[30] Foreign Application Priority Data

Jun. 13, 1996 [DE] Germany .................. 196 23 567.7

[51] Int. Cl.$^6$ .................. B62D 5/22; H02P 5/00
[52] U.S. Cl. .................. 318/268; 180/6.3; 180/422; 180/428; 318/474
[58] Field of Search .................. 318/268, 272, 318/432, 433, 474; 180/6.3, 417, 421, 422, 428, 443, 446

[56] References Cited

U.S. PATENT DOCUMENTS

| 4,392,540 | 7/1983 | Michio et al. . |
| 4,557,343 | 12/1985 | Pickering . |
| 4,828,066 | 5/1989 | Hayashi . |

FOREIGN PATENT DOCUMENTS

44 20 309   12/1995   Germany .

*Primary Examiner*—Bentsu Ro
*Attorney, Agent, or Firm*—Evenson, McKeown, Edwards & Lenahan, P.L.L.C.

[57] ABSTRACT

A hydraulic servo control, particularly a hydraulic power steering system for motor vehicles, has hydraulic pressure pump which is driven by an electric motor. The rotational speed of the electric motor is controlled as a function of the load, so that a high rotational speed occurs only when there is a corresponding demand.

16 Claims, 5 Drawing Sheets

HYDRAULIC SERVO CONTROL PARTICULARLY HYDRAULIC POWER STEERING SYSTEM FOR MOTOR VEHICLES

This application claims the priority of German patent application 196 23 567.7, the disclosure of which is expressly incorporated by reference herein.

BACKGROUND AND SUMMARY OF THE INVENTION

The invention relates to a hydraulic servo control, particularly a hydraulic power steering system for a motor vehicle, having a hydraulic servo motor which can be connected by a servo valve to a delivery side of a hydraulic pump as well as to its suction side (or to a relatively unpressurized hydraulic reservoir), and an electric motor driving the hydraulic pump.

Power steering systems of this type are basically known and offer the advantage that the hydraulic pump can be driven at a constant rotational speed, which can be dimensioned to correspond to the maximum required volumetric displacement of the hydraulic pump.

However, as a rule, hydraulic power steering systems of motor vehicles have a hydraulic pump which can be driven by the vehicle engine and which, depending on the driving conditions, runs at very different rotational speeds. In this case, the pump must be dimensioned so that it can generate a high delivery flow at an idling speed of the engine, as required for steering operations in parking maneuvers. This means that, during a fast drive and a correspondingly increased rotational speed of the vehicle engine, an excessive delivery flow is generated. As a result, conventional power steering systems require a relatively large amount of energy, because the delivery flow of the pump will continuously correspond to, or even exceed significantly, the maximum demand.

It is an object of the invention to clearly lower the energy demand for hydraulic servo controls of the above-mentioned type.

According to the invention, this object is achieved by a hydraulic servo control system or power steering system of the initially mentioned type, in which the electric motor has a rotational speed control that operates as a function of the motor's electric current or power consumption. The rotational speed control automatically changes between a method of operation at an almost constant low rotational speed (standby operation) and a method of operation at an almost constant high rotational speed (load operation). The motor control switches over to the high rotational speed when the electric current or power consumption of the electric motor exceeds a lower threshold value at the low rotational speed. (The threshold value is slightly above a minimal value of the current or power consumption of the electric motor to be expected at the low rotational speed.) On the other hand, the motor speed is lowered to the low rotational speed when the electric current or power consumption of the electric motor at the high rotational speed has only slightly fluctuated for a predeterminable time period, and has remained below an upper threshold value that is slightly above a minimal value of the current or power consumption of the electric motor to be expected at the high rotational speed.

The invention is based on the general idea of achieving a load-dependent rotational speed control of the electric motor of the hydraulic pump based on the fact that the loading of the electric motor caused by the hydraulic pump significantly decreases whenever the servo valve takes up its open normal position or its open center position. The reason is that, in such a condition, a relatively unthrottled path leads from the delivery side of the pump to the suction side (or to the relatively unpressurized hydraulic reservoir). If, in contrast, the servo valve leaves its normal open center position, the throttle resistance on the delivery side of the hydraulic pump will clearly rise. The normal position or the position of the open center will be taken up by the servo valve only when the servo motor needs to generate no servo power at all. Correspondingly, low loads of the electric motor which last for a certain time, such as occur when the servo valve is in the normal position or in the open center position, are a clear indication that a change may take place to the operating condition at a low rotational speed, that is, the standby operation. On the other hand, the invention reliably ensures that operating conditions in which servo power is required (or desirable) are recognized in every case. The reason is that, even at a slight rise of the load of the servo motor, the lower threshold value will be exceeded, so that a change takes place to a high rotational speed, and the pump operates at a correspondingly high delivery output which is also sufficient for generating high servo power.

A special advantage of the invention is the fact that exceeding of the lower threshold value can be determined virtually without any delay, and therefore a very rapid change to a high rotational speed can take place. Correspondingly, a power steering system for motor vehicles constructed according to the invention is always ready to generate servo power before it is necessary from the driver's point of view. Thus, the power steering system according to the invention constantly offers a high degree of comfort.

Also, it is particularly advantageous that no average time values of the electric current or power consumption of the electric motor need be formed in order to recognize the exceeding of the lower threshold value.

In a particularly preferred embodiment of the invention, the rotational speed of the electric motor is regulated or controlled with a time delay when changing to the lower rotational speed, while a switch back to the high rotational speed takes place immediately when the electric current or power consumption of the electric motor exceeds a value before the lowering of the rotational speed, by more than a predetermined or predeterminable slight difference. In this manner, a slow (and comfortable) transition from a high to a low rotational speed can be implemented, and at the same time it can also be ensured that any required servo power is available without delay.

The rotational speed of the electric motor is lowered when the electric current or power consumption of the electric motor has fluctuated only slightly for a predetermined or predeterminable time period, and in the process has remained above an upper threshold which is slightly (for example, 1A) above the current or power consumption of the electric motor in the normal position (open center) of the servo valve at a high rotational speed.

In this invention, it is particularly advantageous that the upper and lower threshold can constantly be adapted to the actual current or power consumption of the electric motor at a high or standby rotational speed. As a result, it is taken into account that the current or power consumption of the electric motor is influenced considerably by temperature changes of the hydraulic medium and the resulting viscosity change or flow-through pressure change.

In order to ensure that, after a cold start at low ambient temperatures, the hydraulic medium heats up as fast as possible, and therefore reaches a condition of low viscosity at which the hydraulic pump must be operated against a comparatively low resistance, it is expedient to let the electric motor run at a high rotational speed until the electric current or power consumption of the electric motor at the high rotational speed falls below a predetermined value which corresponds to the current or power consumption of the electric motor at, for example, 0° C., of the hydraulic medium.

Furthermore, in order to reduce the power consumption and the noise radiation in the range of low load demands, it is also expedient to limit the high rotational speed of the electric motor to a regulated maximum value which, at a median expected voltage, corresponds to the rotational speed of the electric motor at a median load (for example, 35 A at 70 A maximal load). Another advantage of this maximum rotational speed limitation is the fact that the servo valve of the steering gear, in the range of low to medium steering loads, is supplied with a voltage-independent, constant oil quantity and therefore no torque changes which are dependent on the delivered amount occur at the steering wheel.

Optionally, the upper rotational speed may be set to a reduced value when the electric current or power consumption of the electric motor fluctuates only slightly for a predeterminable or predetermined time duration at a level close to a maximum value expected when the servo valve is maximally throttled or closed. In a vehicle steering system, these circumstances will occur only when the steering is adjusted to a stop and is held there, because only in this case will the servo valve of a power steering system reach its maximum throttled or closed position. If this position is held longer, the hydraulic medium may be heated to an undesirable extent, which occurs less intensively as a result of the reduction of the upper rotational speed preferably provided in such cases. At the same time, the hydraulic pump can be protected in this manner from excessive stress.

Other objects, advantages and novel features of the present invention will become apparent from the following detailed description of the invention when considered in conjunction with the accompanying drawings.

DETAILED DESCRIPTION OF THE DRAWINGS

Figure 1:
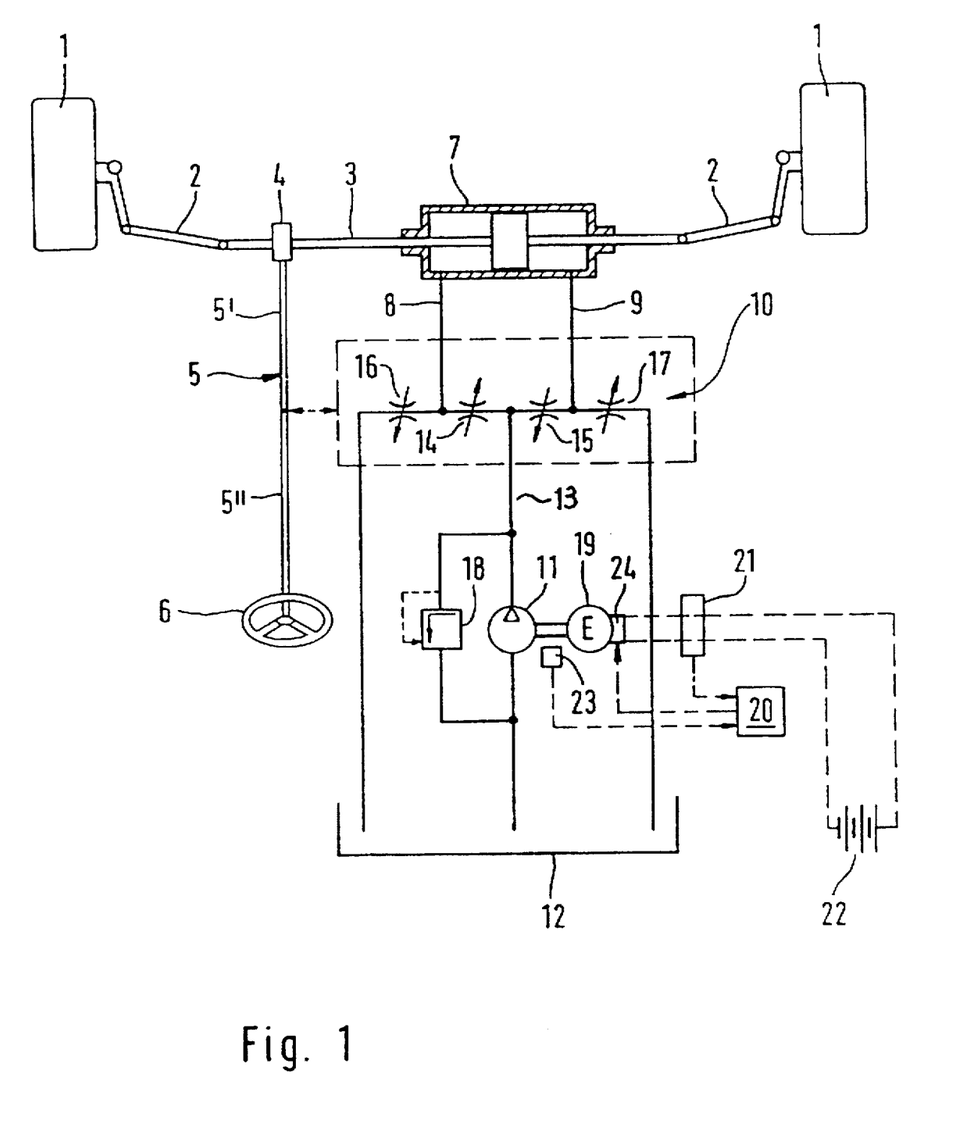
FIG. 1 is a schematic overall representation of a power steering system according to the invention.

According to FIG. 1, a motor vehicle, which is not shown in detail, has steered vehicle wheels 1 which are mechanically positively coupled with a rack 3, by way of tie rods or the like. The rack 3 is drivably connected in turn with a manual steering wheel 6 by way of a pinion 4 and a steering rod 5. The steered vehicle wheels 1 are therefore controlled in a basically known manner by means of the manual steering wheel 6.

The rack 3 is part of a piston rod of a hydraulic servo in the form of a double-acting piston-cylinder unit 7, whose piston working spaces are connected with motor connection 8 and 9 of a conventional servo valve 10. The two sides of the piston-cylinder unit 7 can thus be connected in a controllable manner with the delivery side of a hydraulic pump 11, and/or with a (relatively) unpressurized hydraulic reservoir 12 with which the suction side of the pump 11 also communicates.

The basically conventional servo valve 10 comprises two throttle lines which lead from the delivery connection 13 of the hydraulic pump 11 to the hydraulic reservoir 12, each having one input throttle 14, 15 and one output throttle 16, 17 respectively. In a known manner, these throttles 14 to 17 can be constructed as control gaps between slide-side and housing-side control edges of the servo valve 10. In addition, the throttles 14 to 17 are each adjusted simultaneously, the throttle resistance of one of the input throttles 14 and 15 increasing while the throttle resistance of the respective other input throttle is reduced. The throttle resistances of the output throttles 16 and 17 are also changed in opposite direction with respect to one another, and opposed to the respective assigned input throttle 14 or 15. This is symbolized by the mutually antiparallel arrows on the throttles 14 to 17.

In a center position of the servo valve 10, all throttles 14 to 17 have approximately the same, low throttle resistances; that is, the hydraulic medium delivered by the hydraulic pump 11 can flow over to the reservoir 12 on mutually symmetrical flow paths largely in an unthrottled manner. In this case, the same pressure conditions exist at the motor connections 8 and 9, which are each connected between mutually assigned input and output throttles 14 and 15 as well as 16 and 17. Correspondingly, the same (low) hydraulic pressure also acts on both sides of the piston-cylinder unit 7, with the result that the piston-cylinder unit 7 generates no control force. This condition of the servo valve 10 is also called "open center".

As soon as the servo valve 10 leaves its condition of the open center, the throttle. resistance of an input throttle, such as 14, and of the output throttle of the respective other throttle line, here, for example, 17, is increased while the throttle resistance of the two other throttles 15 and 16 is reduced further. Correspondingly, asymmetrical flow paths are formed from the pressure connection 13 to the hydraulic reservoir 12 so that substantially unequal hydraulic pressures exist at the motor connections 8 and 9. In the illustrated embodiment, the hydraulic pressure at the motor connection 9 is significantly higher than at the motor connection 8. As a result, a corresponding pressure difference exists between the two sides of the piston-cylinder unit 7, which leads to a corresponding control force of the piston-cylinder unit 7.

If the servo valve 10 is controlled into an end position, one of the input throttles 14 and 15 (for example, input throttle 14) and the output throttle assigned to the respective other control line (in the present example, output throttle 17) will close. As a result, on the one hand, the delivery connection 13 of the hydraulic pump 11 is no longer connected with the reservoir 12 by way of the servo valve. In addition, a very high pressure difference acts between the motor connections 8 and 9 and correspondingly between the two sides of the piston cylinder unit 7, which pressure difference results in a correspondingly high control force of the piston-cylinder unit 7. In addition, a pressure limiting valve 18 opens up so that the hydraulic medium delivered by the hydraulic pump 11 will now flow back to the suction side of the pump 11.

The control of the servo valve 10 basically takes place in a known manner as a function of the forces or moments transmitted between the manual steering wheel 6 and the steered vehicle wheels 1. For this purpose, the steering shaft 5 can, for example, have two shaft parts 5' and 5" which can be rotated relative to one another to a limited extent against a spring force and whose relative rotations are then transmitted to the servo valve 10 for its control.

According to the invention, the hydraulic pump 11 is driven by an electric motor 19 which has a rotational speed control 20. This rotational speed control 20 has an input for a first sensor 21 whose signals reflect the electric current and power consumption of the electric motor 19. If, for an electric power supply, the electric motor 19 is connected with a battery 22 or another electric current source whose electric voltage remains constant largely independently of the load, it is sufficient for the sensor 21 to be constructed as an electric ammeter and to sense only intensity of the electric current supplied to the electric motor.

Even if load-dependent voltage drops occur at the terminals of the electric motor because of losses in the supply cables, the motor control according to the invention requires only the sensing of the electric current consumption, because these voltage drops cannot occur until after the switching to the high rotational speed as the result of the load.

In addition, the input side of the rotational speed control 20 is connected with a second sensor 23 which senses the rotational speed of the electric motor 19, for example, a tachometer generator. On the output side, the rotational speed control 20 is connected with a motor control 24 in such a manner that, as illustrated below, the rotational speed control 20 can bring the electric motor 19 to different rotational speed levels or hold it at these rotational speed levels.

Figure 2:
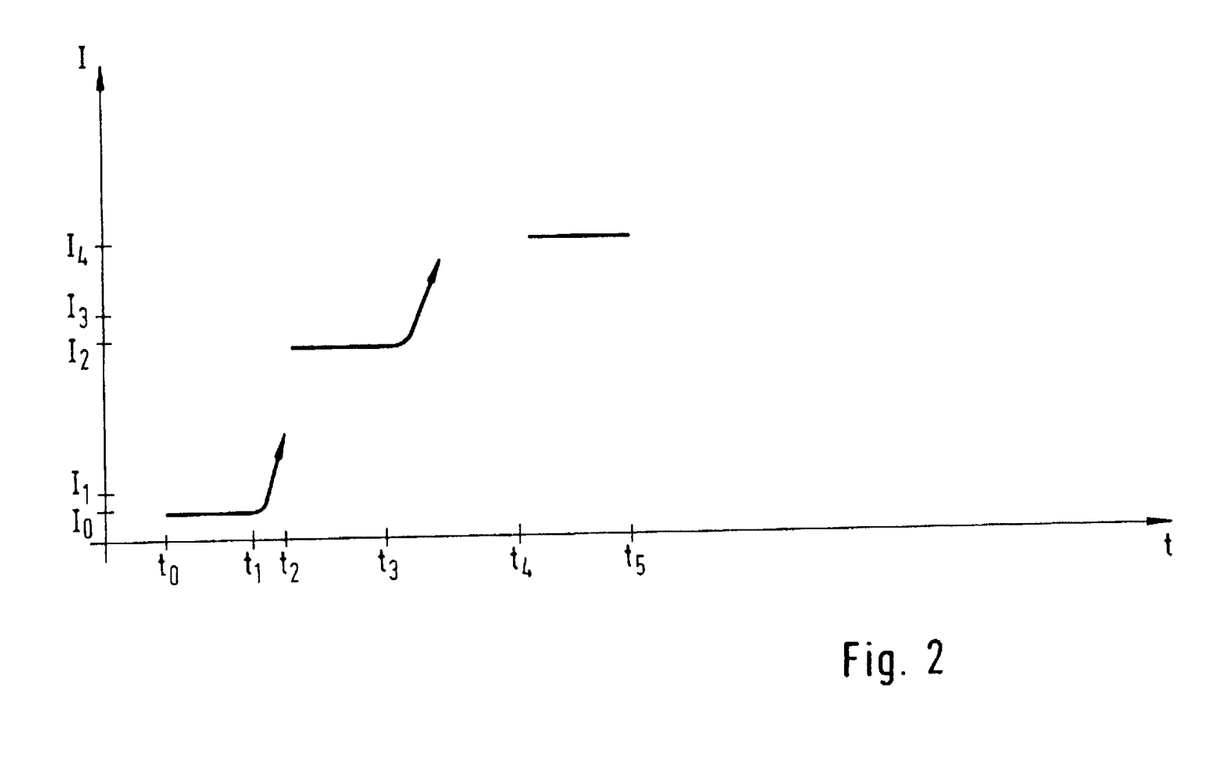
FIG. 2 is a diagrammatic view which reflects the electric current consumption of the electric motor at different constant operating conditions.

FIG. 2 illustrates the electric current consumption I of the electric motor 19 as a function of the time t, for characteristic operating conditions.

It is assumed that, between the points in time to and $t_1$, the electric motor 19 runs at a low rotational speed of, for example, 1,000 r.p.m. The servo valve 10 would be in the condition of its open center, and the hydraulic medium would have a normal operating temperature. The current consumption of the electric motor 19 will then fluctuate slightly about a value $I_0$ which can change within certain limits as a function of the temperature of the hydraulic medium whose viscosity decreases with a rising temperature. After time $t_1$, with an unchanged low rotational speed of the electric motor 19, the servo valve 10 is displaced slightly from its open center, and the hydraulic resistance on the delivery side of the hydraulic pump 11 clearly rises. Because the rotational speed of the electric motor 19 is kept constant by the rotational speed control 20, its current consumption must also clearly rise, and in every case exceeds a value $I_1$ which is closely above (by approximately 1 A) the value $I_0$.

It is now assumed that, between a point in time $t_2$ and $t_3$, the electric motor 19 runs at a constantly high rotational speed of, for example, 3,000 r.p.m., the servo valve 10 again takes up an open center position, and the hydraulic medium has a medium temperature. In this case, the current consumption of the electric motor 19 will fluctuate slightly about a value $I_2$ which, in turn, can shift up or down as a function of the temperature of the hydraulic medium. After the point in time $t_3$, the servo valve 10 is displaced from the condition of its open center, so that the current consumption of the electric motor 19 rises steeply again, and clearly exceeds a value $I_3$ which is slightly (approximately 1 A) above the value $I_2$.

Between the points in time $t_4$ and $t_5$, it is assumed that the electric motor 19 is again held at the above-mentioned high rotational speed, and the servo valve 19 again takes up the condition of its open center. However, the hydraulic medium is assumed to have an extremely low temperature of, for example, −30° C. In this case, the electric current consumption of the electric motor 19 will at first fluctuate about a very high value $I_4$ which initially is quite clearly above a value $I_5$. The current consumption of the electric motor 19 increasingly approaches $I_5$ as the temperature of the hydraulic medium rises, and can fall below this value as the temperature of the hydraulic medium continues to rise, as soon as the temperature of the hydraulic medium has increased to medium temperature values.

Figure 3:
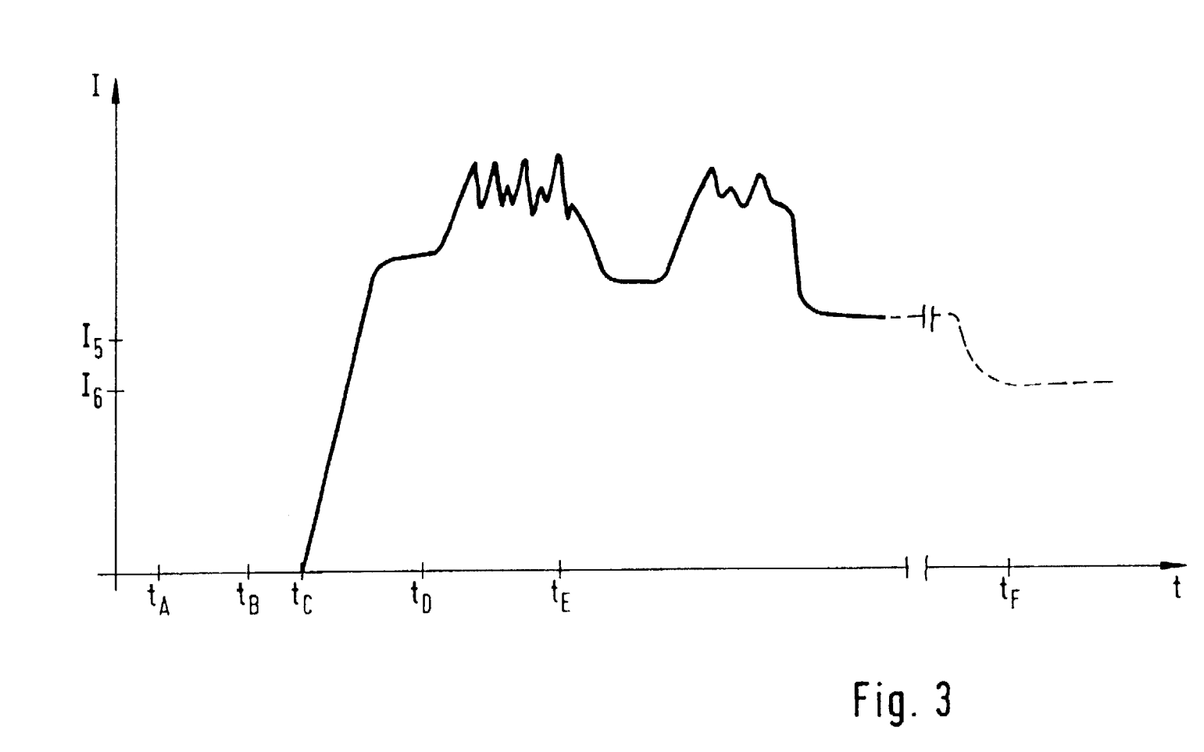
FIG. 3 is a view of a typical time sequence of the electric current consumption of the electric motor at very low ambient temperatures and a correspondingly viscous hydraulic medium.

FIG. 3 explains a typical operating sequence after a start of the vehicle at a very low ambient temperature, and with a correspondingly cold hydraulic medium. The current consumption I of the electric motor 19 is shown again as a function of the time t.

It is assumed that at a point in time $T_A$ the starter of a vehicle engine is operated which, at a point at time $t_B$, starts to run automatically. After a short time delay, during which a basically conventional engine control has stabilized the idling of the vehicle engine, the electric motor 19 will start automatically at a point in time $t_C$, in which case the rotational speed control 20 first switches the electric motor 19 to the high rotational speed. Correspondingly, the electric current consumption of the electric motor 19 rises steeply after the point in time $t_C$ and, because of the very cold hydraulic medium, in every case, exceeds the value $I_5$. When now steering maneuvers take place between the points in time $t_D$ and $t_E$ which result in a shifting of the servo valve 10 from the condition of its hydraulic center, the current consumption I of the electric motor 19 will exhibit strong fluctuations about very high values of I. If no steering maneuvers take place and no disturbing influences affect the steered vehicle wheels 1, the servo valve 10 can take up the condition of its open center with the result that the current consumption of the electric motor 19 will still fluctuate only slightly but, because of the at first still very low temperature of the hydraulic medium, will continue to have a high value above the value $I_5$.

After a warm-up phase at a high rotational speed, the current consumption falls below the predetermined value $I_5$ which corresponds, for example, to a current consumption of the electric motor at 0 C. of the hydraulic medium. This is achieved by a corresponding initial value of the upper threshold below which, as described above, the electric current or power consumption of the electric motor must fall at a high rotational speed, so that the condition for the lowering of the rotational motor speed is met.

The upper threshold value is set to the starting value $I_5$ at every new start of the vehicle. As a result, it is ensured that a rotational speed reduction takes place only when the hydraulic medium is warmed up and clearly defined conditions exist for the rotational speed control of the electric motor.

Therefore, after the point in time $t_F$, a phase can occur for the first time in which the current consumption, while the servo valve 10 remains in the center position, fluctuates slightly about a value $I_6$ which is below the threshold $I_5$. If, in this case, the current falls sufficiently below the threshold value $I_5$ and a slight fluctuation of the electric current consumption exists over a predetermined time period, the rotational speed control 20 will lower the rotational speed of the electric motor 19 in a manner illustrated below to the low rotational speed.

Figure 4:
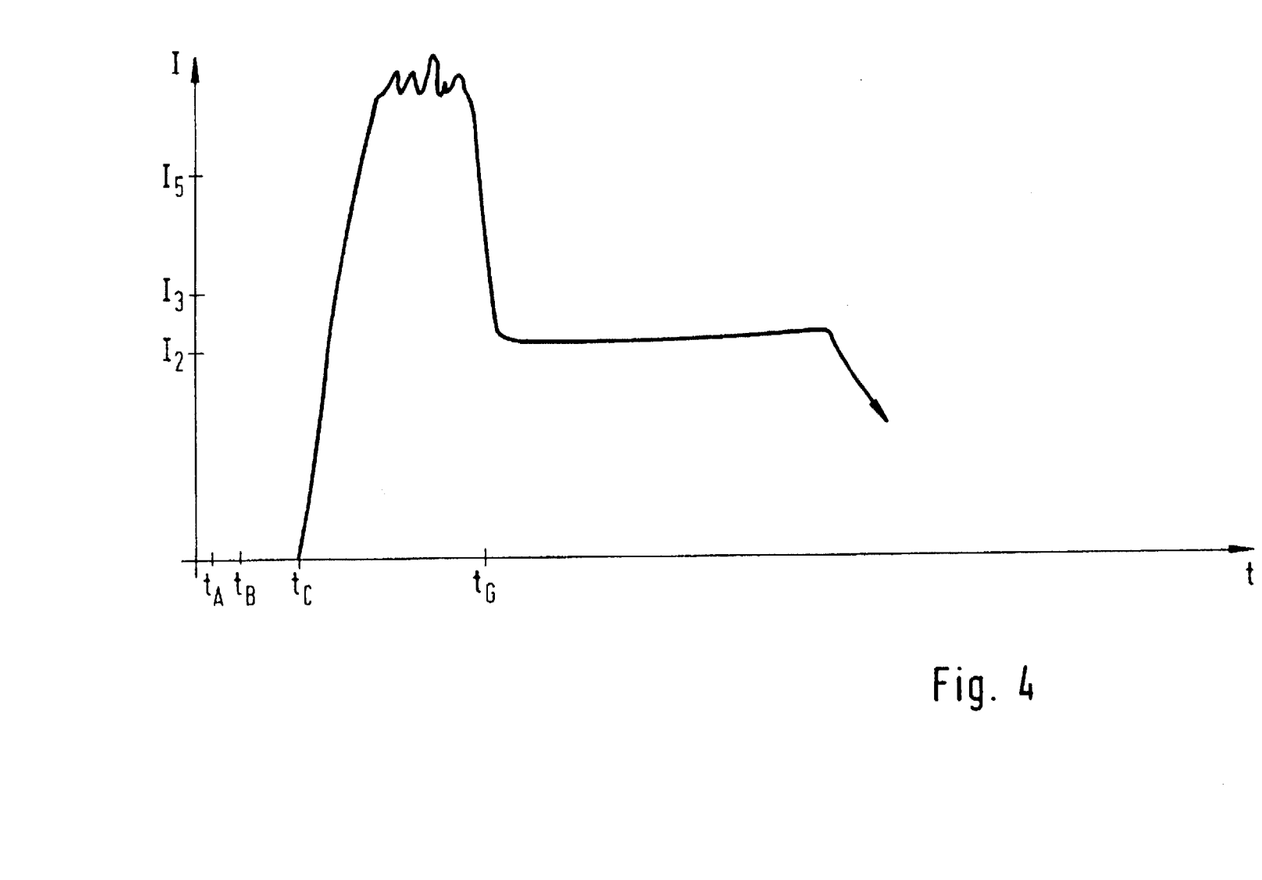
FIG. 4 is a corresponding diagram at normal temperature conditions and with a normally liquid hydraulic medium.

FIG. 4 shows the conditions at a medium temperature of the hydraulic medium. The starter of the vehicle engine is again operated at a point in time $t_A$. The vehicle engine starts to run automatically at a point in time $t_B$. After a predetermined time delay, the rotational speed control 20 switches on the electric motor 19 at a pint in time $t_C$ and again brings it to the high rotational speed. Because of the high temperature of the hydraulic medium, the current will exceed $I_5$ only when the servo valve 10 is shifted from its open center; that is, a steering maneuver is carried out. If no steering maneuver is carried out (or after the conclusion of the steering maneuver at a point in time $t_G$), the current consumption I will fluctuate slightly about the value $I_2$ which is below the value $I_3$ stored as a threshold value in the rotational speed control 20. If such conditions occur for a predetermined time period, the rotational speed control 20 will lower the rotational speed of the electric motor 19 in a manner illustrated below, to the low rotational speed. After a cold start at low ambient temperatures (FIG. 3), $I_3$ will correspond to the value $I_5$.

Figure 5:
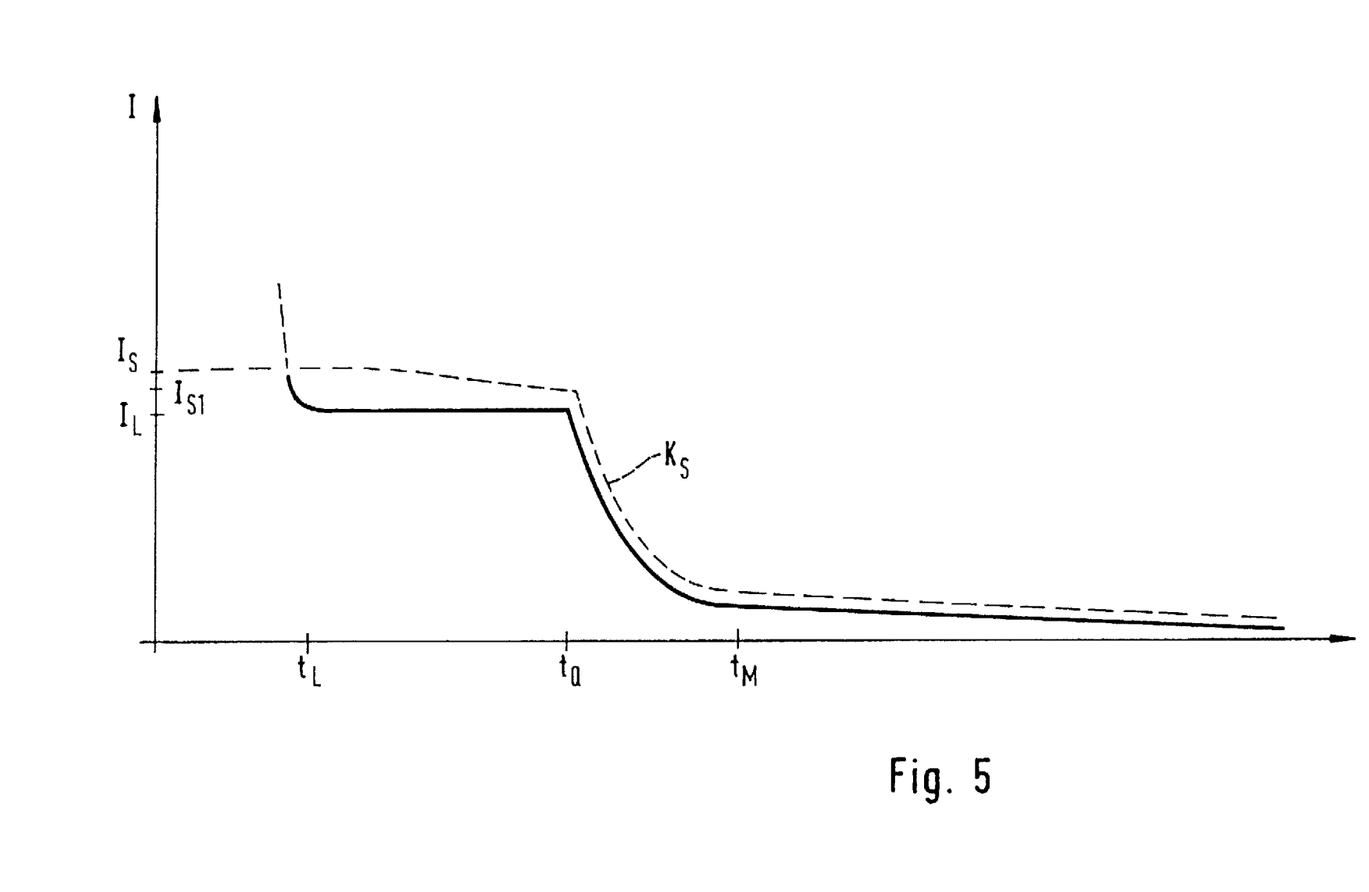
FIG. 5 is a diagram which illustrates the operating phases of a lowering of the rotational speed of the motor from the high to the low value as an example.

FIG. 5 explains the lowering of the rotational speed of the electric motor 19 from the high to the low rotational speed, and the adaptation of the upper and lower threshold value to the actual temperature-dependent values of the electric current consumption of the electric motor. After the end of a steering maneuver, at which the electric motor 19 runs at a high rotational speed and has a strongly fluctuating, very high current consumption, it is now assumed that an operating phase starts at the point in time $t_L$ when the servo valve 10 remains in the condition of its open center because no steering maneuver takes place. As a result, the electric current consumption of the electric motor 19 (which, for the time being, is still running at a high rotational speed) still fluctuates only slightly about a relatively low value $I_L$, slightly below an upper threshold value $I_S$, determined in a preceding operating phase, and may, for example, be identical with the value $I_5$ or $I_3$. If this condition lasts for a sufficiently long time because the servo valve 10 remains in its open center position, the rotational speed control 20 will lower the rotational speed of the motor 19. From the median value $I_L$ about which the current consumption has fluctuated, a new threshold value $I_{S1}$ is determined for the subsequent operation which was correspondingly reduced in the case of the warming-up of the hydraulic medium since the last storage of $I_S$, specifically $I_{S1} = I_L + I_{distance}$ (for example, $I_{distance} = 1A$) and is stored.

In the case of the cooling of the hydraulic medium since the last storage of $I_S$, a distinction is made between two cases:

1. Slight cooling: Current value $I_L$ falls below $I_S$ but is higher than at the point in time of the determination of $I_S$ ($I_S - I_{distance} < I_L < I_S$). A correspondingly increased threshold value $I_{S1}$ is determined and stored.

2. Clear cooling: Current value $I_L$ exceeds $I_S$ ($I_L > I_S$) This condition will be described below.

The rotational speed reduction takes place at a point in time $t_Q$ first at a relatively high rate of change and then at an increasingly lower rate of change. Correspondingly, the current consumption of the electric motor 19 at first decreases relatively rapidly and then more slowly. Analogously to the lowering of the actual current consumption of the electric motor, a threshold value which is constantly determined according to the curve $K_S$ which exceeds slightly (by about 1A) the actual current consumption.

If a steering maneuver takes place during this phase, with the servo valve 10 deflected from its open center position, the current consumption of the electric motor necessarily rises virtually abruptly above the respective actual value of the curve $K_S$. The rotational speed control 20 will then immediately switch the electric motor 19 back to the high rotational speed and the above-described sequence is repeated.

If no steering maneuver takes place, and the servo valve 10 therefore remains in the condition of its open center, approximately at the point in time $t_M$, the low rotational speed is reached. If now the condition of the servo valve 10 does not change, the actual current consumption of the electric motor 19 will fluctuate slightly about a very low value which may change slowly as a function of the temperature. In this case, the curve $K_S$ follows the actual current consumption in the downward direction (as the temperature of the hydraulic medium rises) without any significant delay. In the upward direction (when the temperature of the hydraulic medium falls), the curve $K_S$ can follow only on a long-term basis.

This ensures that when the servo valve 10 leaves its open center position because of a steering maneuver, the actual current consumption of the motor 19 immediately exceeds the respective actual value of the curve $K_S$.

During a steering maneuver which follows, the rotational speed control 20 will control the electric motor 19 again in the direction of the low rotational speed only when the current has fallen below the last stored threshold value $I_{S1}$ for a sufficiently long time period.

Should this not take place for comparatively long time periods in which the actual current consumption of the electric motor 19 fluctuates only slightly (which may occur when the hydraulic medium is cooled because of slow straight-ahead, driving at a low rotational speed), the rotational speed control 20 will slowly raise the last determined threshold value $I_S$ in order to permit a lowering of the rotational speed to the lower value for a longer period of time. As the result of the only slow raising of the last mentioned threshold value $I_S$, it is ensured that a so-called stationary circular driving of the motor vehicle can lead to no lasting change of threshold values. Such a stationary circular driving is characterized by a largely constant steering angle of the steered vehicle wheels 1 and almost constant steering forces. As a result, for a longer time period, the servo valve 10 can, in an unchanged manner, take up a position which is slightly shifted with respect to the open center position. Correspondingly, the actual current consumption of the electric motor 19 can also fluctuate only slightly, but at a higher level. As the result of the slow raising of the above-mentioned threshold value $I_S$, this threshold value can change only comparatively little also when the stationary circular driving lasts longer. It essentially remains close to a level which occurs at a high rotational speed of the electric motor 19 and simultaneously during the condition of the open center position of the servo valve 10.

If the vehicle steering is held at an end stop for an extended time period, the servo valve 10 remains in a closed condition for a correspondingly long time, during which the delivery connection 13 cannot communicate with the hydraulic reservoir 12 by way of the servo valve 10. The hydraulic medium delivered by the hydraulic pump 11 thus flows by way of the pressure limiting valve 18 constantly directly to the suction side of the pump 11 and heats up relatively fast. In this condition the current consumption I of the electric motor 19 remains constantly at extremely high values. If this remains so for a certain time period, the rotational speed control 20 will lower the high rotational speed first to a reduced value. This will have only relatively minor effects with respect to the current consumption of the electric motor 19 because, as before, the pump 11 must operate against a high hydraulic resistance. Nevertheless, possible additional warming-up of the hydraulic medium is at least slowed down.

If now subsequently, during the conclusion of the steering maneuver, the servo valve 10 again takes up the open center position for a certain time period, the actual current consumption I of the electric motor 19 will again fall below the last upper threshold value $I_{S1}$, so that the rotational speed control 20 will be able to lower the rotational speed to the low value. If a steering maneuver takes place during the lowering of the rotational speed, it causes the actual current consumption I of the electric motor 19 to rise again considerably, exceeding the respective actual values of the curve $K_S$, because an upward correction of the respective last value of the curve $K_S$ takes place only slowly (that is, at longer time intervals). As a result, the rotational speed control 20 again controls the electric motor 19 rapidly to the high rotational speed (for example, 3,000 r.p.m.).

The rotational speed control 20 can also be designed for analyzing signals of additional sensors which exist in the vehicle anyhow for different purposes. Although such signals are not directly required for the load-dependent rotational speed control of the electric motor 9, they can be used for a plausibility test of the respective switched-on condition, so that the rotational speed control 20 can constantly test itself with respect to the correct operation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A hydraulic servo control for a hydraulic power steering system of a vehicle, comprising:

a hydraulic servo motor;

a hydraulic pump having a delivery side and a suction side;

an electric motor for driving said hydraulic pump;

a servo valve having an open center position, said servo valve controllably connecting said hydraulic servo motor to said delivery side of said pump as well as to one of the suction side of said pump and an unpressurized reservoir; and an electric speed control unit for controlling rotational speed of said electric motor as a function of one of electric current and electric power consumption of said motor, which speed control unit changes automatically between standby operation at an approximately low rotational speed, and load operation at an approximately constant high rotational speed, wherein said electric speed control unit switches to the high rotational speed when said one of electric current and power consumption of the electric motor exceeds a lower threshold value at the low rotational speed, which threshold value is slightly above a first minimum value of said one of current and power consumption of the electric motor at the low rotational speed; and said electric speed control unit switches to the low rotational speed when said one of electric current and power consumption of the electric motor at the high rotational speed has fluctuated minimally for a predeterminable time period and has remained below an upper threshold value which is slightly above a second minimal value of the current or power consumption of the electric motor at the high rotational speed.

2. Servo control according to claim 1 wherein when changing to the lower rotational speed, the rotational speed of the electric motor is lowered with a time delay; and a switch back to the high rotational speed takes place immediately when said one of electric current and power consumption of the electric motor exceeds a value which preceded lowering of the rotational speed, by more than a predeterminable difference.

3. Servo control according to claim 1 wherein the high rotational speed substantially exceeds the low rotational speed.

4. Servo control according to claim 1 wherein, at least at a low ambient temperature, the electric motor starts with a predeterminable time delay after start of an engine used for driving said vehicle.

5. Servo control according to claim 1 wherein the electric motor remains at a high rotational speed until said one of electric current and power consumption of the electric motor at the high rotational speed first falls below a predeterminable threshold value which corresponds to a predetermined temperature of the hydraulic medium at a high rotational speed.

6. Servo control according to claim 5 wherein said predetermined temperature is approximately 0° C.

7. Servo control according to claim 1 wherein the lower threshold value is automatically adapted to changing operating conditions, in each case, after a predeterminable time interval, within which said one of electric current and power consumption of the electric motor has fluctuated only slightly at the low rotational speed, a new lower threshold value being set which is proximately above a value during said time interval.

8. Servo control according to claim 1 wherein during a falling tendency of said one of electric current and power consumption of the electric motor at the low rotational speed, a correspondingly rapid reduction of the lower threshold value takes place when the electric current and power consumption fluctuates only slightly.

9. Servo control according to claim 1 wherein during a rising tendency of the electric current or power consumption of the electric motor at the low rotational speed, the lower threshold value rises slowly in order to recognize relatively slow steering movements by the exceeding of this threshold.

10. Servo control according to claim 1 wherein the upper threshold value is automatically adapted to changing operating conditions, first an upper initial threshold value being set which is situated proximately above a minimal value of said one of current and power consumption of the electric motor at a low temperature of the hydraulic medium, at the high rotational speed.

11. Servo control according to claim 1 wherein before each decrease of the rotational speed of the electric motor to the low rotational speed, a new upper threshold value is set which is proximately above a value of said one of current and power consumption of the electric motor during a preceding operating phase in which, for a predetermined time period, an only slight fluctuation has existed of the electric current or power consumption of the electric motor.

12. Servo control according to claim 1 wherein the high rotational speed of the electric motor is limited to a regulated maximum value which, for a medium expected * voltage, corresponds to a rotational speed of the electric motor at a medium load.

13. Servo control according to claim 1 wherein a reduced value is set for the upper rotational speed when, for a predeterminable time period, said one of electric current and power consumption of the electric motor has been approximately equal to a maximum value in the case of a maximally throttled or closed servo valve.

14. Servo control according to claim 13 wherein the upper rotational speed is set back to an original high value in the case of a following lowering of the electric current or power consumption as the result of a less throttled position of the servo valve.

15. Servo control according to claim 1 wherein the rotational speed control unit has inputs for additional operating parameters of a motor vehicle which can be analyzed also for different purposes.

16. Servo control according to claim 10 wherein said low temperature of the hydraulic medium is 0° C.

* * * * *